(12) United States Patent
Bagaini et al.

(10) Patent No.: US 8,982,665 B2
(45) Date of Patent: Mar. 17, 2015

(54) DITHERED SLIP SWEEP VIBROSEIS ACQUISITION SYSTEM AND TECHNIQUE

(75) Inventors: Claudio Bagaini, Cottenham (GB); Ian Moore, Highfields Caldecote (GB)

(73) Assignee: WesternGeco L.L.C., Houston, TX (US)

( * ) Notice: Subject to any disclaimer, the term of this patent is extended or adjusted under 35 U.S.C. 154(b) by 1631 days.

(21) Appl. No.: 12/247,284

(22) Filed: Oct. 8, 2008

(65) Prior Publication Data

US 2010/0085836 A1 Apr. 8, 2010

(51) Int. Cl.
*G01V 1/00* (2006.01)

(52) U.S. Cl.
CPC ...................................... *G01V 1/005* (2013.01)
USPC .......................................................... 367/41

(58) Field of Classification Search
CPC ....................................................... G01V 1/005
USPC ................. 367/38–41, 55; 181/111
See application file for complete search history.

(56) References Cited

U.S. PATENT DOCUMENTS

| | | | |
|---|---|---|---|
| 4,982,374 A | 1/1991 | Edington et al. | |
| 6,519,533 B1 * | 2/2003 | Jeffryes | 702/17 |
| 7,050,356 B2 | 5/2006 | Jeffryes | |
| 2005/0128874 A1 * | 6/2005 | Herkenhoff et al. | 367/56 |
| 2007/0195644 A1 * | 8/2007 | Marples et al. | 367/39 |
| 2009/0168600 A1 | 7/2009 | Moore et al. | |

FOREIGN PATENT DOCUMENTS

| | | |
|---|---|---|
| GB | 2306219 A | 4/1997 |
| GB | 2447236 A | 10/2008 |
| WO | 2008110743 A2 | 9/2008 |

OTHER PUBLICATIONS

Meunier, et al., Analysis of the Slip Sweep Technique, SEG International Exposition and Annual Meeting, Sep. 2001, vol. 20.
Meunier, et al., Cost-Effective, High-Density Vibroseis Acquisition, SEG Annual Meeting, 2005, vol. 24.
Ras, et al., Harmonic Disortion in Slip Sweep Records, SEG Expanded Abstracts, 1999, vol. 18.
Rozemund, Slip-Sweep Acquisition, SEG Expanded Abstracts, 1996, pp. 64-67, vol. 15.
Thacker, et al., Simulation of an Aggressive Slip Sweep Scheme in the Western Desert, Egypt, SEG Expanded Abstracts, 2000, vol. 19.
Wams, et al., Recent Development in 3-D Acquisitions in 3-D Acquisition Techniques using Vibroseis in Oman, The Leading Edge, Aug. 1998, pp. 1053-1063, vol. 17.

* cited by examiner

*Primary Examiner* — Krystine Breier

(57) ABSTRACT

A technique includes generating vibroseis sweeps for a vibroseis survey to produce seismic data acquired in response to seismic signals produced by the sweeps. The generation of the vibroseis sweeps including temporally arranging the sweeps into time-overlapping groups. The technique includes regulating a timing of the groups relative to each other based on a slip time. The technique also includes regulating a timing of the sweeps of each group such that consecutive sweep firings of each group are spaced apart by a time substantially less than the slip time.

6 Claims, 5 Drawing Sheets

US 8,982,665 B2

DITHERED SLIP SWEEP VIBROSEIS ACQUISITION SYSTEM AND TECHNIQUE

BACKGROUND

The invention generally relates to a dithered slip sweep vibroseis acquisition system and technique.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones). Industrial surveys may deploy only one type of sensors or both. In response to the detected seismic events, the sensors generate electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on dry land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes generating vibroseis sweeps for a vibroseis survey to produce seismic data acquired in response to seismic signals produced by the sweeps. The generation of the vibroseis sweeps including temporally arranging the sweeps into time-overlapping groups. The technique includes regulating a timing of the groups relative to each other based on a slip time. The technique also includes regulating a timing of the sweeps of each group such that consecutive sweep firings of each group are spaced apart by a time substantially less than the slip time.

In another embodiment of the invention, a technique includes receiving seismic data acquired in response to vibroseis sweeps arranged in time-overlapping groups. The technique includes processing the seismic data based on a slip time separation technique to separate the data into first datasets that are each associated with a different one of the groups. The technique includes processing the first datasets based on a source dithering separation technique to separate each first dataset into second datasets that are each associated with a different one of the sweeps.

In another embodiment of the invention, a system includes actuators and a control subsystem. The actuators generate vibroseis sweeps for a vibroseis survey to produce seismic data acquired in response to seismic signals produced by the sweeps. The vibroseis sweeps are arranged in time-overlapping groups. The control subsystem regulates a timing of the groups relative to each other based on slip time and regulates a timing of the sweeps of each group such that consecutive sweep firings of each group are spaced apart by a time substantially less than the slip time.

In yet another embodiment of the invention, a system includes an interface and a processor. The interface receives seismic data acquired in response to vibroseis sweeps temporally arranged in time-overlapping groups. The processor processes the seismic data based on a slip time separation technique to separate the data into first datasets that are each associated with a different one of the groups; and the processor processes the first datasets based on a source dithering separation technique to separate each first dataset into second datasets that are each associated with a different one of the sweeps.

Advantages and other features of the invention will become apparent from the following drawing, description and claims.

DETAILED DESCRIPTION

Figure 1:
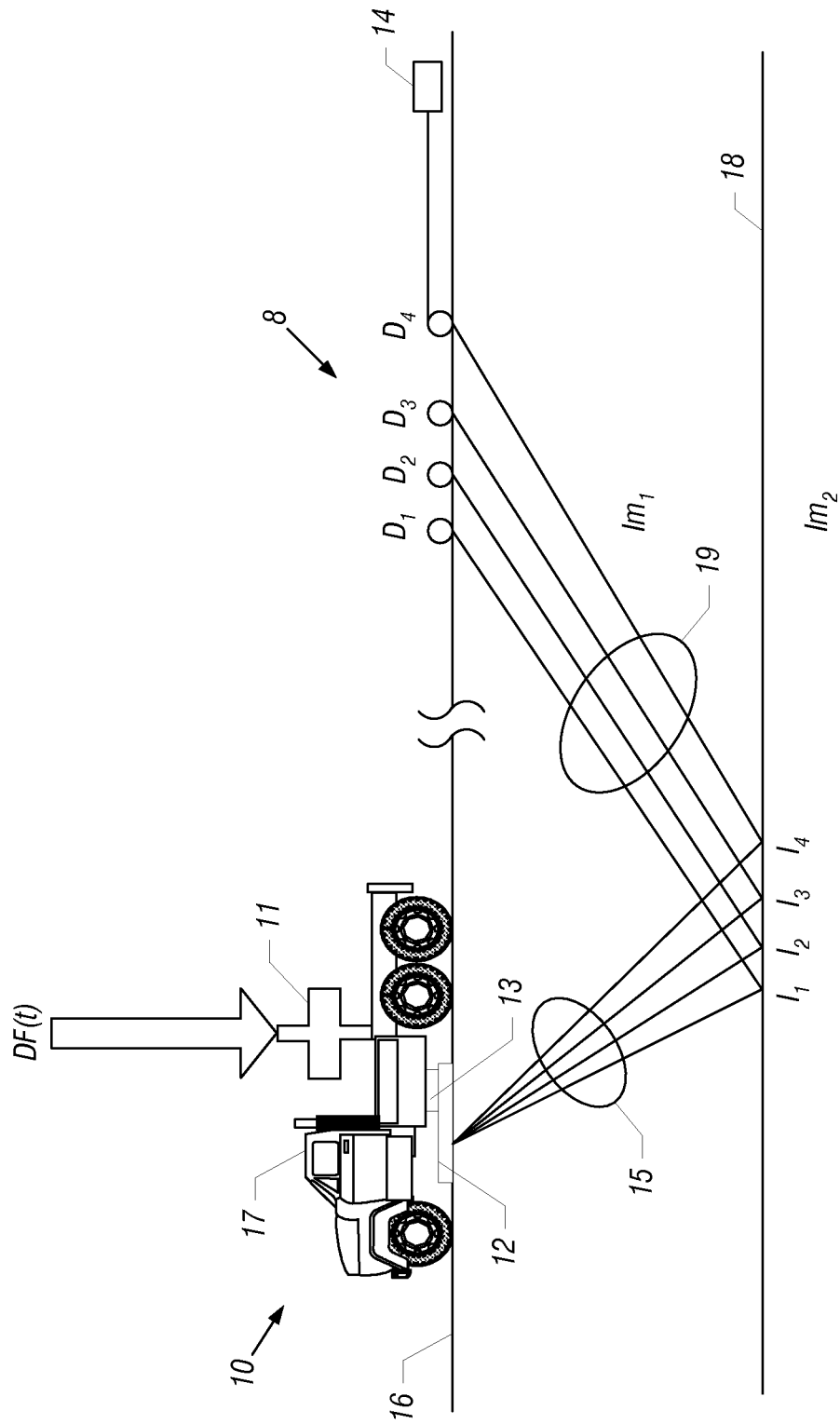
FIG. 1 is a schematic diagram of a vibroseis acquisition system according to an embodiment of the invention.
Figure 2:
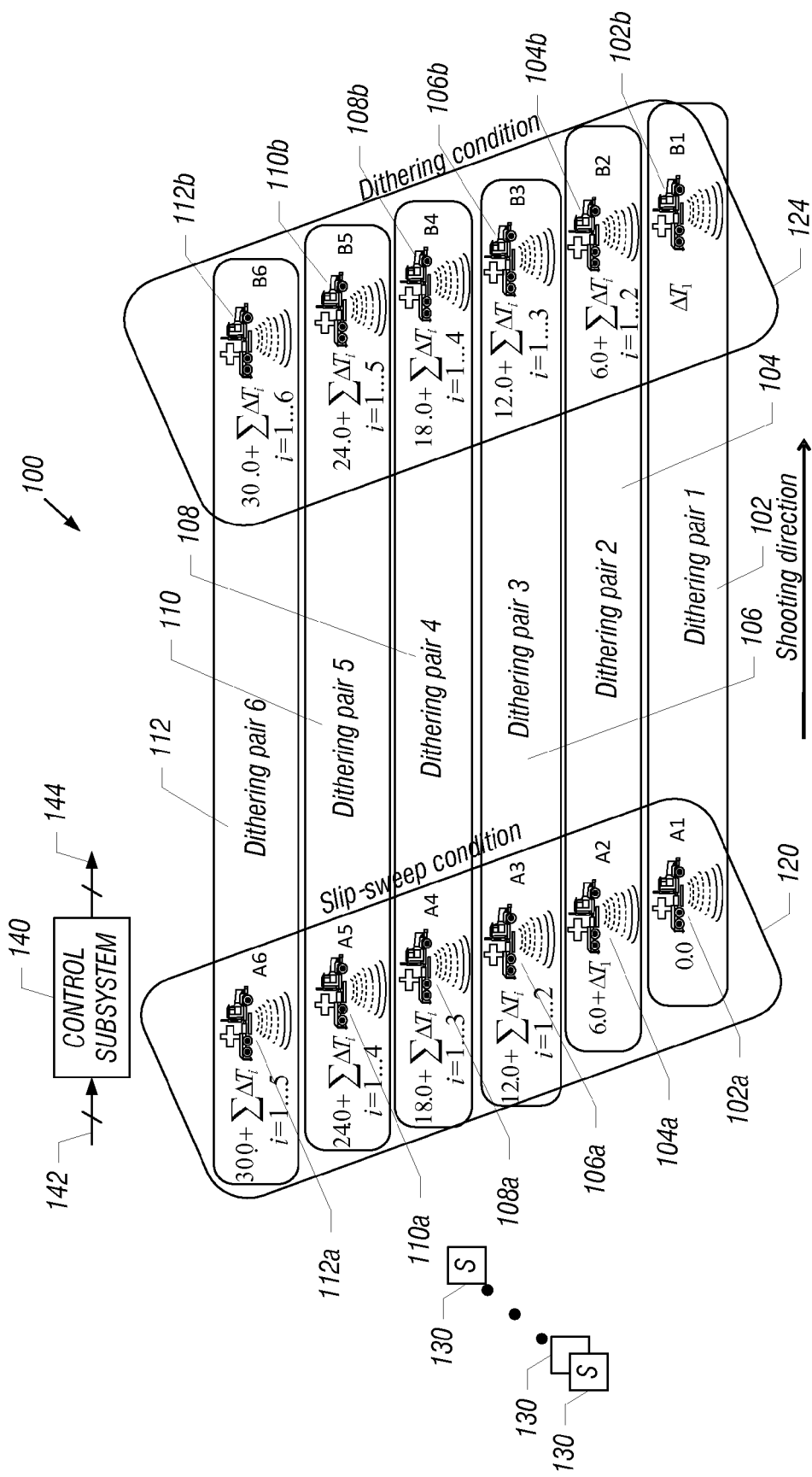
FIG. 2 is an illustration of a dithered slip sweep vibroseis survey system according to an embodiment of the invention.

Referring to FIG. 1, an exemplary land-based vibroseis acquisition system 8 in accordance with embodiments of the invention includes multiples seismic vibrators 10 (one of which is depicted in FIG. 2); surface-located geophones $D_1$, $D_2$, $D_3$ and $D_4$; and a data acquisition system 14. As part of operations associated with a vibroseis survey, the seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The geophones $D_1$, $D_2$, $D_3$ and $D_4$ acquire measurements of sweeps that are generated by other seismic vibrators 10, as described further below. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15.

Among its other features, the seismic vibrator 10 may include a signal measuring apparatus 13, which includes sensors (accelerometers, for example) to measure the signal 15 (i.e., to measure the output ground force of the seismic vibrator 10). As depicted in FIG. 1, the seismic vibrator 10 may be mounted on a truck 17, an arrangement that enhances the vibrator's mobility.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep, the frequency of the DF(t) signal transitions (and thus, the oscillation frequency of the reaction mass transitions) over a range of frequencies, one frequency at time. The amplitude of the DF(t) signal may be linearly or non-linearly varied during the generation of the sweep pursuant to a designed amplitude-time envelope.

It is noted that unlike the seismic vibrator 10, a seismic vibrator may alternatively be constructed to be located in a borehole, in accordance with other embodiments of the invention. Thus, seismic sensors, such as geophones, may alternatively be disposed in a borehole to record measurements produced by energy that is injected by borehole-disposed vibrators. Although specific examples of surface-located seismic vibrators and seismic sensors are described herein, it is understood that the seismic sensors and/or the seismic vibrators may be located downhole in accordance with other embodiments of the invention.

Due to the mechanics and movement of the seismic vibrator, the overall time consumed in generating a vibroseis sweep significantly exceeds the sweep length, or duration, which is just one component of the overall time. For example, the overall time involved in generating a particular vibroseis sweep includes a time associated with deploying the base plate (such as the base plate 12 depicted in FIG. 1); the time to raise the base plate; and a time to move the seismic vibrator from the previous location to the location in which the sweep is to be injected. Therefore, for purposes of increasing acquisition efficiency, a vibroseis seismic acquisition system may include multiple seismic vibrators that generate multiple vibroseis sweeps in a more time efficient manner, as compared to generating the sweeps with a single seismic vibrator. Care is exercised to ensure that the multiple seismic vibrators are operated in a manner that permits separation of the corresponding sensed seismic signals according to the sweep that produced the signal (i.e., for purposes of source separation). One technique involves using multiple seismic vibrators to generate a succession of vibroseis sweeps and imposes a "listening time" interval between successive sweeps (i.e., an interval between the end of a particular sweep and the beginning of the next consecutive sweep). With this approach, the measurements produced by a given sweep are recorded during the listening time before the next sweep begins.

For purposes of further increasing the acquisition efficiency when multiple seismic vibrators are used, a "slip sweep" technique may be used, as described in, for example, Rozemond, H. J., 1996, *Slip-sweep acquisition,* 66$^{th}$ Annual International Meeting, SEG, Expanded Abstracts, 64-67. In the slip sweep technique, a particular sweep begins without waiting for the previous sweep to terminate. In the absence of harmonic noise, if the time interval between the beginning, or firing, of consecutive sweep sequences (called the "slip time") is greater than the listening time, then the seismic responses to the consecutive sweep sequences do not overlap in the time-frequency domain, which facilitates separation of the measurements.

If, however, harmonic noise is present, the seismic responses do overlap in the time-frequency domain and correspondingly deteriorate the quality of the acquired seismic data. U.S. Pat. No. 7,050,356, entitled "METHOD OF SEISMIC SURVEYING," which issued on May 23, 2006, and is hereby incorporated by reference discloses a technique to attenuate this harmonic noise when the slip time is above a certain value that does not depend upon the acquisition parameters. PCT Publication No. 2008/110743, entitled "VIBROSEIS ACQUISITION METHOD," which has a filing date of Mar. 9, 2007, and is hereby incorporated by reference in its entirety, extends this technique to smaller slip times, which are equal to or greater than the listening time.

In accordance with embodiments of the invention described herein, the efficiency of the vibroseis survey is further enhanced by combining the slip sweep technique with a source dithering technique. With source dithering, seismic sources are operated close in time, which causes the corresponding seismic signals to interfere with each other for at least part of the record in the recorded time-frequency space. However, as described in U.S. patent application Ser. No. 11/964,402, entitled "SEPARATION OF SIMULTANEOUS SOURCE DATA," which was filed on Dec. 26, 2007, and is hereby incorporated by reference in its entirety, the data acquired from simultaneously or near simultaneously fired interfering seismic sources may be processed via a source separation technique (called a "source dithering separation technique" herein) to separate the acquired data according to the producing source. More specifically, in this technique, the acquired seismic data undergoes a preprocessing step to produce corresponding datasets that each correspond to one of the interfering sources and do not correspond to the other interfering sources. In accordance with embodiments of the invention, the source dithering involves slightly varying the times at which the sweep sequences in a dithered group are initiated, or fired, via a predetermined schedule or through a randomly or pseudo randomly generated timing.

The initiation, or firing, times are separated by significantly less durations than the above-described slip times. More specifically, the sources in a dithered group are varied by dither times. Both the slip and dither times are time intervals between the beginning times of consecutive sweeps. The slip time is always larger than the listening time, whereas the dither time is significantly smaller than the listening time.

A slip time separation technique would not sufficiently separate the measurements produced by a particular dithered group of sweeps. However, the measurements acquired from a source dithered group may be source separated as follows. When traces are collected into a domain that includes many firings of each interfering source and are aligned such that time zero corresponds to the firing time for a specific source, then the signal from the source appears coherent while the signal from the other sources appears incoherent. As described in U.S. patent application Ser. No. 11/964,402, although the signal from the specific source appears to be coherent while the signal from the other sources appear to be incoherent, the apparently incoherent signals are not mathematically incoherent due to the known timing delays. Therefore, the recorded data may be decomposed into data associated with each source using, for example, Radon transforms.

In accordance with embodiments of the invention described herein, a vibroseis-based seismic survey uses both the source dithering and slip sweep techniques to enhance the efficiency of the survey. The technique is illustrated using an exemplary system 100 that is schematically depicted in FIG. 2. Referring to FIG. 2, in general, the system 100 includes multiple seismic vibrators that are controlled by a control subsystem 140 (via its input 142 and output 144 terminals) to generate sweep sequences pursuant to a "dithered slip sweep sequence," which is described below. The seismic vibrators may inject the same sweep patterns (at different times) or may inject different sweep patterns (different phases to cause frequency-dependent dithering, as further discussed below), depending on the particular embodiment of the invention. The control subsystem 140 may be disposed on a particular seismic vibrator; disposed on a platform that is separate from the seismic vibrators; distributed among the seismic vibrators; etc. As depicted in FIG. 2, the system 100 includes seismic sensors 130 (geophones, as a non-limiting example) that acquire seismic measurements in response to the seismic signals that result from the sweeps.

The vibroseis sweeps are temporally arranged in time-overlapping groups; and the groups are generated successively and overlap each other in time such that the initiation, or firing, of the first sweep of each group is separated by at least a slip time from the initiation, or firing, of the first sweep of the previously generated group. For the example that is depicted in FIG. 2, each slip sweep group is a pair of sweeps: pair 102 (sweeps 102a and 102b), pair 104 (sweeps 104a and 104b), pair 106 (sweeps 106a and 106b), pair 108 (sweeps 108a and 108b), pair 110 (sweeps 110a and 110b) and pair 112 (sweeps 112a and 112b). The first sweep 102a, 104a, 106a, 108a, 110a or 112a of each pair (called the "master sweep," herein) is, in general, initiated, or fired, beginning at a slip time from when the last master sweep was initiated, or fired. Thus, the sweeps 102a, 104a, 106a, 108a, 110a and 112a are constrained by a slip time condition 120.

In the absence of harmonic noise and if the earth response has a finite length, the slip time condition 120 imposes a time interval equal to the earth's impulse response. In presence of harmonic noise, a more restrictive slip time condition is applied. Due to the slip time condition 120, a slip time separation technique may be used to separate the acquired seismic data into datasets, where each dataset is associated with the measurements produced by a different pair 102, 104, 106, 108, 110 or 112. The slip sweep separation may involve separating the acquired seismic data according to the pairs based on the time-frequency separation that is due to the slip condition 120. The slip sweep separation may involve additional processing if significant harmonic energy is present, as described in the references mentioned above.

The sweeps of each pair are dithered, which means that the sweeps of each pair are fired at different times, but the firing times of the sweeps are substantially closer together in time than the slip time. Therefore, the seismic signals that are produced by the sweeps of each pair substantially interfere with each other in the time-frequency space, and a source dithering separation process is used to source separate the signals acquired for each group. Thus, the second sweeps 102b, 104b, 106b, 108b, 110b and 112b are constrained by a dithering condition 124.

Due to the dithering condition 124, a source dithering separation technique, such as the one disclosed in U.S. patent application Ser. No. 11/964,402 (as a non-limiting example), may be used to source separate the measurements attributable to each pair. The source dithering separation technique may be carried out in the common receiver domain.

As a more specific example, a dithered slip sweep sequence may be generated in the following manner, in accordance with embodiments of the invention. The sequence is partially defined by a dithering time called "$\Delta T_i$," which may be positive or negative and represents the firing time of the second sweep in the dithered pair (where "i" is the dithered pair index), relative to the firing time of the master sweep of the pair. The minimum and maximum dithering times are denoted by "$T_{min}$" and "$T_{max}$," respectively, and the following conditions for the firing sequence applies. The firing times for both sweeps 104a and 104b of the pair 104 need to be more than the slip time, ST, after the later of the firing times of the sweeps 102a and 102b. Also, the sweep 104b fires at time $\Delta T_2$ after the sweep 104a. The earliest firing time for 104a is therefore given by the sum of ST and maximum(0, $\Delta T_1$) less minimum(0, $\Delta T_2$). The worst case occurs when $\Delta T_1 = T_{max}$ and $\Delta T_2 = T_{min}$.

The firing times may be made independent of the actual dither times by assuming the worst case for each dither, in which case the sweep 104a fires at the sum of ST and maximum(0, $T_{max}$) less minimum(0, $T_{min}$) after 102a. There are three cases for this: $T_{max} > T_{min} > 0$, $T_{max} > 0 > T_{min}$ and $0 > T_{max} > T_{min}$, with corresponding firing delays of $ST + T_{max}$, $ST + T_{max} - T_{min}$ and $ST - T_{min}$, respectively. In the special case for which all the $\Delta T_i$ are positive, the earliest firing time for the sweep 104b becomes $ST + \Delta T_1$, and this, along with $ST = 6$ second(s), is the case shown in FIG. 2.

The example that is depicted in FIG. 2 is based on the following parameters:

| | |
|---|---|
| N = number of available seismic vibrators = 12 | SL = sweep length = 12 s |
| PU = pad up time = 4 s | PD = pad down time = 6 s |
| MU = move-up time (for 25 meters (m)) = 9 s | MST = Minimum slip-time = 6 s |
| LTIM = listening time = 4 s | |

Furthermore, for this example, the six vibrators whose sweep start time is dictated by the slip-sweep condition 120 are located on different shot lines.

The acquisition parameters listed above imply a cycle time (called "CT") per vibrator of $$CT = 36.0 + \sum_{i=1...6} \Delta T_i \text{ seconds(s)}.$$

This cycle time may be kept by each vibrator because the total move-up time (SL+PU+PD+MU=31s) is less than the cycle time CT.

In the above example, the maximum number of successive sweeps that may interfere with a given sweep is five. For example, the sensed seismic signals produced by the sweeps 102b, 104a, 104b, 106a and 106b are recorded before the end of the listening time of 102a, and therefore may interfere with it; and the slip sweep and source dithering separation techniques that are disclosed herein may be applied to remove these interfering signals.

The above example is included for illustrative purposes only, as other embodiments are contemplated and are within the scope of the appended claims. For example, other variants include vibrators whose start times are slip-sweep constrained and located on the same shot line and/or pairs of vibrators that form dithered pairs on different source lines. As another example, the actual vibrators to which either the dithering or slip-sweep condition is applied may change during the survey; and the recording system stores in memory the previous two start times to decide whether a dithering or a slip-sweep condition must be applied to the start time of the next sweep. As yet another example, there may be more than two sweeps in a dithered group.

Figure 3:
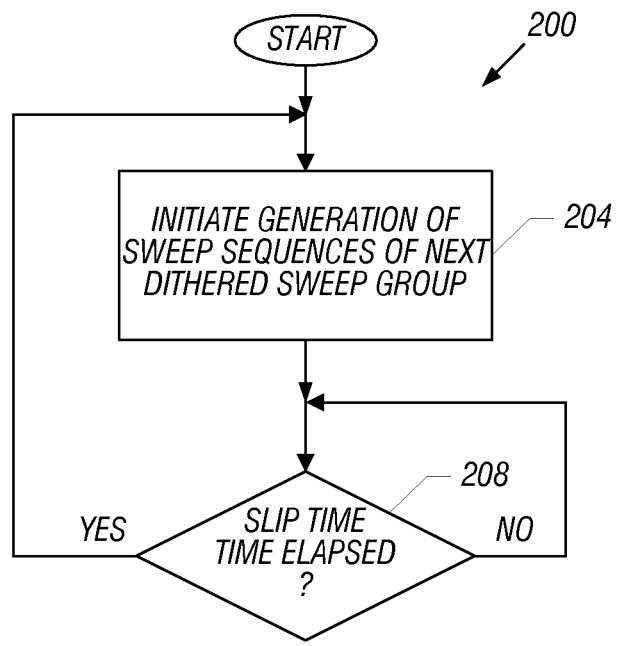
FIG. 3 is a flow diagram depicting a technique to generate sweep sequences in a dithered slip sweep vibroseis survey according to an embodiment of the invention.

To summarize, FIG. 3 depicts a technique 200 that may be used by the control subsystem 140 (see FIG. 2) for purposes of implementing a dithered slip sweep acquisition in accordance with embodiments of the invention. Pursuant to the technique 200, the control subsystem 140 initiates generation of the sweep sequences of the next dithered group, pursuant to block 204. The control subsystem 140 monitors the elapsed time since the generation of the first slip sequence of the present dithered group to determine (diamond 208) whether the slip time has elapsed. If so, then the control subsystem 140 returns to block 204 to initiate the generation of sweep sequences for the next dithering group.

Figure 4:
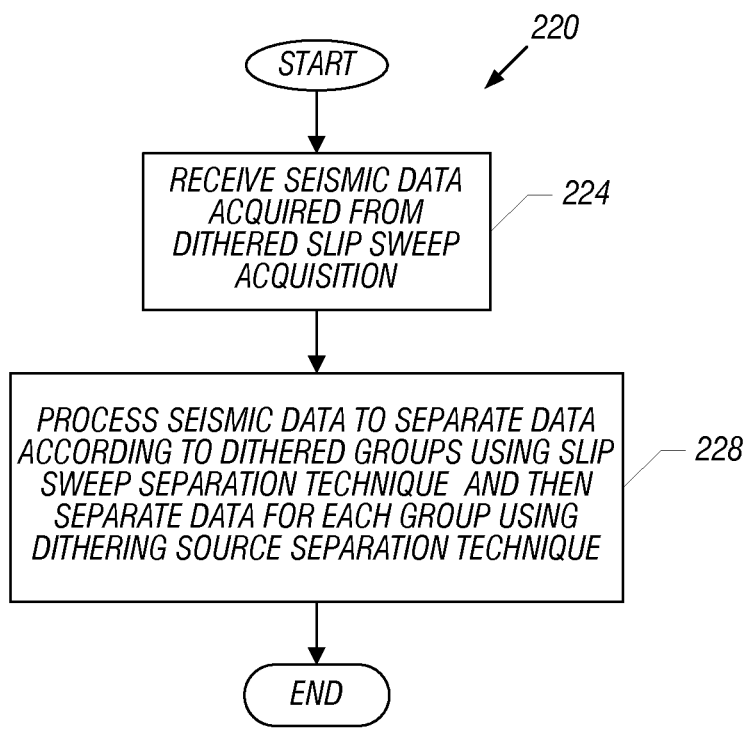
FIG. 4 is a flow diagram depicting a technique to process seismic data acquired in a dithered slip sweep vibroseis survey according to an embodiment of the invention.

FIG. 4 depicts a technique 220 that may be used for purposes of processing data acquired in a dithered slip sweep acquisition in accordance with embodiments of the invention. Pursuant to the technique 220, seismic data, which were acquired from a dithered slip sweep acquisition are received, pursuant to block 224. The seismic data are processed (block 228) to separate data according to the dithered groups using a slip sweep separation technique, and the resulting data are processed to separate the data according to the sweeps using a dithered source separation technique, pursuant to block 228.

Figure 5:
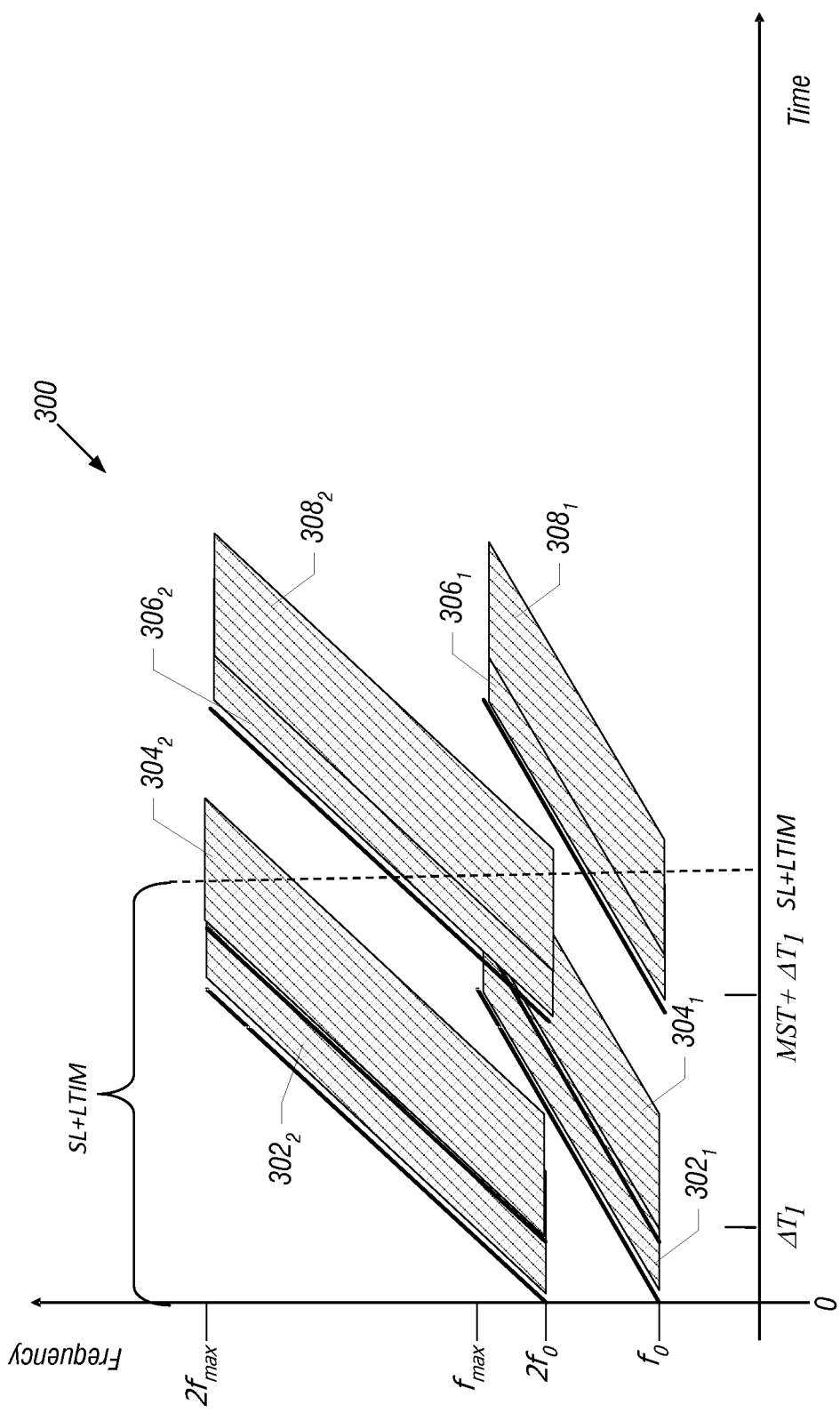
FIG. 5 is a time-frequency illustration of a single trace acquired in connection with the dithered slip sweep vibroseis survey according to an embodiment of the invention.

FIG. 5 is a time-frequency representation illustration 300 of a single trace acquired using the dithered slip sweep vibroseis survey technique that is disclosed herein. It is assumed in the illustration 300 for purposes of simplicity that only the second harmonic energy cannot be ignored. Referring to FIG. 5, the response of the earth's interior to the source fundamental (also called the first harmonic) and the second harmonics are indicated in the parallelograms in FIG. 5. More specifically, the parallelograms designated by reference numerals with reference numerals with subscripts of "2" refer to the second harmonic, and the parallelograms that have subscripts of "1" refer to the source fundamentals. As a more specific example, the acquired response $302_1$ refers to the fundamental response due to the first shot, and the parallelogram $302_2$ refers to the second harmonic produced by the first shot. Likewise, the parallelograms $304_1$, $306_1$ and $308_1$ refer to the source fundamentals due to the second, third and fourth shots, respectively. Additionally, the parallelograms $304_2$, $306_2$ and $308_2$ refer to the second harmonics due to the second, third and fourth shots, respectively.

For this example, the firing time of shot one is at time zero, and the firing time of shot two is the dither time, or $\Delta T_1$. The firing time for shot three is $MST+\Delta T_1$. The firing time of shot three is therefore linked to the firing time of shot two by a slip-time condition, whereas the firing time of shot two is linked to the firing time of shot one by a dithering time condition.

The fundamental response $302_1$ in the interval of interest (i.e., the interval of interest between time zero and time SL+LTIM) is contaminated by the fundamental responses $304_1$, $306_1$ and $308_2$ and by the harmonic responses $302_2$, $304_2$ $306_2$ and $308_2$. The contamination that does not overlap in time-frequency domain may be eliminated using such techniques as those described in U.S. Pat. No. 7,050,356 and PCT Publication No. 2008/110743. The contamination that overlaps in the time-frequency domain may be eliminated with a three or higher fold (depending on the dither time) dithering separation approach, as disclosed in U.S. patent application Ser. No. 11/964,402.

In accordance with some embodiments of the invention, the slip sweep separation is followed by the dither separation. The contamination caused by fundamental responses $306_1$ and $308_1$ and the harmonic responses $302_2$, $304_2$ $306_2$ and $308_2$ is eliminated using the slip sweep approach. The contamination due to the fundamental response $304_1$ (the most severe one) is successively attenuated with a two-fold dithering separation approach. The $304_1$ contamination may be eliminated by applying the dithering separation technique in the common receiver gather domain, such as the technique disclosed in U.S. patent application Ser. No. 11/964,402.

In other embodiments of the invention, the contamination caused by the responses $306_1$ $308_1$, $302_2$ and $304_2$ is eliminated using the slip sweep approach. For this approach, the contamination due to the response $304_1$ (the most severe one), $306_2$ and $308_2$ is successively attenuated with a four-fold dithering separation approach.

In another embodiment of the invention, a dithering separation approach may be first applied in the interval of interest for all of the contaminating sources, and this approach has been followed by a slip sweep approach to eliminate the remaining contamination.

In another variation, the slip sweep and dither approaches may be simultaneously applied.

In yet another variation, all of the coherent sources in the time interval from time zero to time SL+LTIM are simultaneously migrated. The time-frequency representation of all of the coherent sources is in fact known with a high level of accuracy due to the fact that the signal emitted by each vibrator is controlled by a feedback system that minimizes the difference between the transmitted ground-force and a reference signal.

In yet another approach, the dithering time is frequency dependent. Such dependency may be obtained in the simplest with constant phase shift between sweeps.

Figure 6:
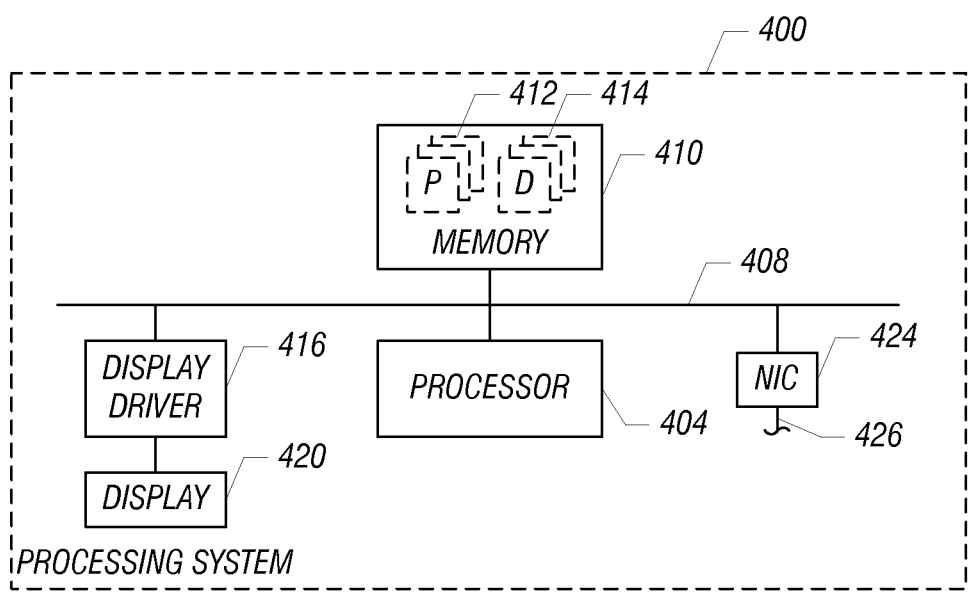
FIG. 6 is a schematic diagram of a processing system according to an embodiment of the invention.

Referring to FIG. 6, in accordance with some embodiments of the invention, the seismic data that are acquired in a dithered slip sweep vibroseis acquisition may be processed by a processing system 400. In general, the processing system 400 may include at least one processor 404, such as a microcontroller and/or microprocessor. In general, the processor 404 may be coupled through one or more buses 408 to a memory 410, which stores various programs 412 and datasets 414. The programs 412 may, when executed by the processor 404, cause the processor 404 to receive seismic data acquired from a dithered slip sweep vibroseis acquisition and process the data to separate the data according to the slip sweep groups and perform source separation for the dithered groups. Thus, in general, the processor 404 may apply all or part of the technique 220 (see FIG. 4) that is described herein. Initial, intermediate, or final processing results may be stored as the datasets 414 in the memory 410.

It is noted that FIG. 6 depicts merely an example of one out of many possible architectures for the processing system 400. Thus, many variations are contemplated and are within the scope of the appended claims. For example, in accordance with other embodiments of the invention, the processing system 400 may be a distributed processing system and thus, may include processing subsystems that are connected together and may be located in different locations.

For the processing system 400 that is depicted in FIG. 6, the processing system 400 may include a display driver 416 that drives a display 420 for purposes of displaying the results of the processing by the processor 404. As examples, the display 420 may display time and/or frequency spectra of the acquired seismic measurements, as well as time and/or frequency spectra of the measurements after the slip time and/or dithered source separation techniques have been performed. Additionally, as depicted in FIG. 6, the processing system 400 may include interfaces to communicate with other computer and/or processing systems, such as a network interface card (NIC) 424, which is connected to a network 426.

Other embodiments are contemplated and are within the scope of the appended claims. For example, in accordance with some embodiments of the invention, because of logistics, the dither and slip sweep sequences may not be interlaced. For example, because of logistics, a cycling sequence like the following may be applied: dither-slip sweep-slip sweep, etc. This may happen if the third vibrator to which a dither condition is supplied is not ready and therefore, a less strict slip time condition is applied.

As an example of another variation, the vibrators may be fired in a different order than the order described in connection with FIG. 2. For example, the vibrator associated with the sweep 102b in FIG. 2 may not be ready. However, another vibrator may be ready and can begin sweeping because the dithering condition is satisfied.

As another example, in some embodiments of the invention, a set of different initial phases may be applied to the sweeps. As an example, this set of initial phases may be determined according to the technique disclosed in U.S. Pat. No. 4,982,374, entitled, "METHOD OF SOURCE CODING AND HARMONIC CANCELLATION FOR VIBRATIONAL GEOPHYSICAL SURVEY SOURCES," which issued on Jan. 1, 1991, and is hereby incorporated by reference in its entirety.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    receiving seismic data acquired in response to vibroseis sweeps temporally arranged in time-overlapping groups;
    processing the seismic data based on a slip time separation technique to separate the seismic data into first datasets that are each associated with a different one of the groups; and
    processing the first datasets in a processor-based machine based on a source dithering separation technique to separate each first dataset into second datasets that are each associated with a different one of the sweep sequences.

2. The method of claim 1, wherein the processing includes, for each group, processing the seismic data based on a timing at which the sweeps of the group are generated.

3. The method of claim 1, wherein the groups of sweeps are spaced apart in time based on slip times.

4. The method of claim 1, wherein each group consists essentially of a pair of sweeps.

5. The method of claim 1, wherein the acts of processing the seismic data based on the slip time separation technique and processing the first datasets based on the source dithering separation technique occur simultaneously.

6. The method of claim 1, wherein the acts of processing the seismic data based on the slip time separation technique and processing the first datasets based on a source dithering separation technique comprise simultaneously migrating all coherent sources in a time interval from time zero to a time equal to the summation of the sweep and listening times.

* * * * *